United States Patent [19]

Mancuso

[11] 4,058,214
[45] Nov. 15, 1977

[54] CARRYING AND INSULATING ENCLOSURE FOR PIZZA PIE CONTAINERS

[76] Inventor: Louis C. Mancuso, 121 Brooklyn-Stanhope Road, Stanhope, N.J. 07874

[21] Appl. No.: 678,889

[22] Filed: Apr. 21, 1976

[51] Int. Cl.$^2$ .................. B65D 11/10; B65D 51/16; A45C 11/20
[52] U.S. Cl. .................. 206/545; 220/4 B; 220/9 F; 220/366; 229/2.5 R
[58] Field of Search .............. 206/545, 525; 220/360, 220/366, 367, 9 F, 4 B, 4 E; 229/2.5

[56] References Cited

U.S. PATENT DOCUMENTS

| | | | |
|---|---|---|---|
| 1,216,031 | 2/1917 | Wilcox | 220/367 |
| 3,484,015 | 12/1969 | Rowan | 206/545 |
| 3,708,086 | 1/1973 | Colato | 220/366 |

Primary Examiner—William T. Dixson, Jr.
Attorney, Agent, or Firm—Mel K. Silverman; David A. Jackson

[57] ABSTRACT

A carrying and insulating enclosure for a pizza container is provided which includes a square base having, on the interior surface thereof, a plurality of depressions intended for the collection of condensed moisture emanating from foods within the container. The lid of the present enclosure contains a vapor venting system, including a closure capability which may be shifted between a closed vent condition for purposes of maximum heat retention and an open vent condition for purposes of vapor discharge and, thus, added crispiness of the food within the container.

4 Claims, 3 Drawing Figures

CARRYING AND INSULATING ENCLOSURE FOR PIZZA PIE CONTAINERS

BACKGROUND OF THE INVENTION

The present invention relates to a carrying and insulating enclosure for pizza pie containers and, more particularly, to a generalized enclosure for carrying take-home foods which are normally carried from the business establishment in a container such as a cardboard box.

The use of a conventional cardboard pizza box has proved to have many shortcomings. More particularly, such a standard cardboard box suffers from a number of functional deficiencies. These include the following: lack of durability, lack of insulating capacity, lack of proper ventilation, and difficulty in transportation thereof within an auto vehicle.

The prior art in this area is represented by U.S. Pat. No. 3,335,846 (1967) to R. E. Mills. Said patent discloses a shallow, flat shell-like enclosure intended to serve as a carrying and insulating means for food products such as pizza pie.

Said patent is not intended to provide a means for carrying a pizza which has already been enclosed within a conventional pizza-carrying box.

Nonetheless, the above patent represents one of the few efforts which have been directed toward the problem of properly insulating and supporting so-called carry-out foods, such as a pizza pie, during the trip from the business establishment to the customer's home.

Accordingly, the present invention can be viewed as an improvement over the state of the art relative to carrying an insulating means for particular categories of carry-out foods.

SUMMARY OF THE INVENTION

The present carrying and insulating enclosure comprises a bottom section and a top section or lid, said bottom section includes a hollow rectangular solid having internally disposed therein a baffle-like structure intended for the collection of condensed moisture. About the upper periphery thereof is a circumferential lip having a pair of oppositely disposed air vents. Said upper section comprises a lid adapted for a complementary disposition within said circumferential lip. Said lid possesses a capability for disposal in either of two modes, the first mode comprising a vapor venting mode in which vapors are enabled to escape, the second mode comprising a vapor occlusion mode, intended for maximum heat retention. The use of a particular mode is dependent upon the particular food product utilized within the present enclosure.

It is an object of the present invention to provide an inexpensive carrying and insulating container for carry-out type foods during the transportation of the food from the place of purchase to the home.

It is a further object of the present invention to provide an insulated enclosure for hot food which has already been placed within a conventional food container.

It is a yet further object of the present invention to provide a carrying and insulating enclosure having a ventilation system which, depending upon the type of food enclosed, can change with respect to the degree of ventilation permitted.

It is a still further object of the present invention to provide an enclosure of the above type having a design which will minimize the escape of moisture from said enclosure.

Above and further objects of the present invention will become apparent from a consideration of the following description with reference to the accompanying drawings.

DETAILED DESCRIPTION OF THE INVENTION

Figure 1:
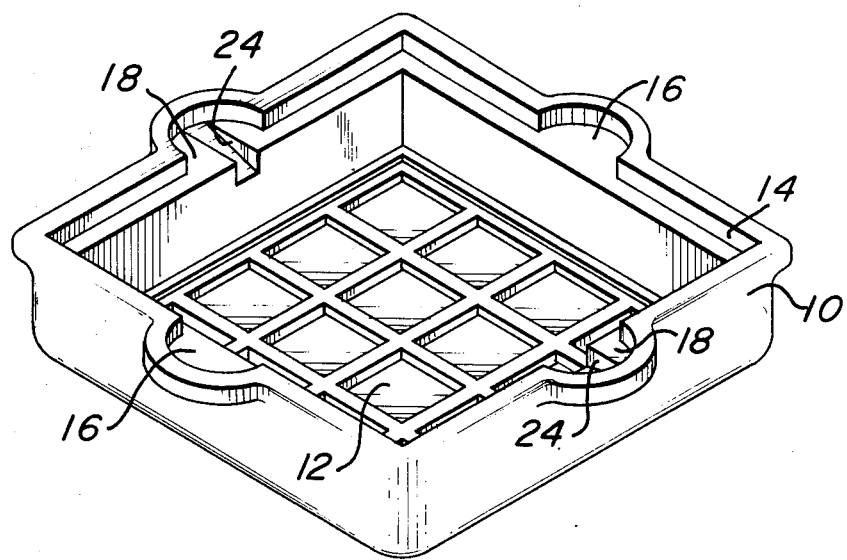
FIG. 1 is a perspective view of the lower section of the present carrying and insulating enclosure.

Shown in FIG. 1 is a base, designated generally by reference numeral 10, said base including a plurality of molded recesses 12 which are disposed within the interior surface of said base.

Further, the base is provided with a circumferential flange 14. Said flange is characterized by two pairs of lid detents 16 and 18. Detent pair 16 comprises a simple, semicircular surface having a transversely disposed horizontal area.

Figure 2:
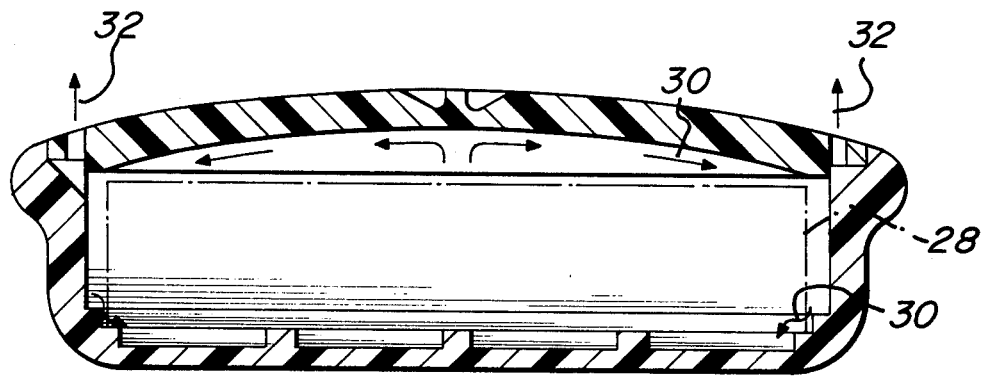
FIG. 2 is a side cross-sectional view of the present enclosure.
Figure 3:
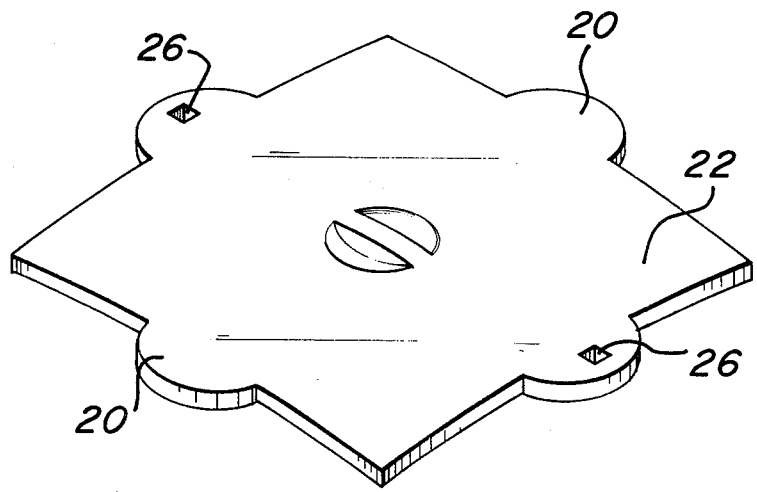
FIG. 3 is a perspective view of the lid of the present enclosure.

Detent pair 16 is intended to secure circular protrusions 20 of lid 22 which is shown in FIG. 3. In order to achieve the insertion of protrusions 20 into areas 16, the lid 22 is bowed into a concave relationship with respect to the base 10. This concave relationship is shown, in cross-sectional view, in FIG. 2.

Turning now to the second pair of lid detents 18, it is noted that each of said detents is formed so as to exhibit a vent 24. Through the presence of said vents, the lid 22 can be inserted in such a disposition as to permit the alignment of lid holes 26 with said vents 24. When the lid is applied in such a disposition, the vents will be open, thereby permitting the vapors of the pizza box to escape, allowing the crust of the pizza to remain crispier.

However, should the user carry the container over an extended period of time, he may wish to choose a lid disposition which would afford a maximum heat retention. In order to achieve such a disposition, the lid is applied such that protrusions 20 are inserted within lid detent pair 18. In this disposition, the vents 24 are covered, thereby cutting off the possible escape of vapors, thus, creating a condition of maximum heat retention.

It is to be noted that, as shown in FIG. 2, the concavity of the lid 22 permits the condensed moisture to travel to the edge of the inside of the container and then drop into the recesses 12 of the container, rather than falling directly onto the paperboard pizza box 28. The direction of flow of said moisture is indicated by arrows 30. It is noted that arrows 32 indicate the heat escape route which exists when the optional venting mode is utilized.

It is to be appreciated that the recesses 12 represent that area in which all condensed moisture will naturally accumulate, thereby minimizing possible water damage to the paperboard pizza box.

It is thus seen that the above invention depicts a practical carrying and insulating enclosure, usable as a means for the protection of pizzas contained within a conventional paperboard pizza box, which is durable and possesses a capability for an indefinite number of reusages.

The present container may be formed of a plurality of different materials; however, it is believed that plastic polystyrene would comprise one of the more practical materials.

In one embodiment, the present container may possess a height of four inches, with a length and width of 19 inches.

While there have been herein shown and described the preferred embodiments of the present invention, it will be understood that the invention may be embodied otherwise than as herein specifically illustrated or described, and that within said embodiments certain changes in the detail and construction, and the form and arrangement of the parts may be made without departing from the underlying ideas or principles of this invention within the scope of the appended claims.

I claim:

1. A carrying and insulating enclosure for carry-home foods comrising:
    a hollow base comprising a rectangular food support surface, defining a plurality of regularly spaced, shallow moisture storing recesses therein,
    an upwardly extending wall member extending the perimeter of said food support surface and integral therewith,
    a laterally extending lip disposed along the perimeter of the upper edge of said wall member, said lip defining a plurality of semicircular, laterally extending protrusions lying in paired, diametrically opposed relationship to each other, said protrusions defining a corresponding number of lid detents,
    at least two bevelled vent structures provided in at least one pair of diametrically opposed lid detents, and
    a lid having a peripheral configuration adapted for complementary press-fittable engagement with said detents, said lid comprising regularly spaced, diametrically opposed projections corresponding in shape to said detents and adapted to mate therewith, at least one pair of said projections provided with vent openings situated to facilitate the selective registration with said bevelled vent structures.

2. The enclosure of claim 1 wherein said surface defines a horizontal plane for the disposition of a food container thereon in spaced relation to said recesses.

3. The enclosure of claim 1 wherein said enclosure is prepared from polystyrene.

4. The enclosure of claim 1 further including a handle provided in said lid comprising parallel, semicircular indentations provided centrally in one surface thereof.

* * * * *